United States Patent

Quinn

[15] 3,636,264

[45] Jan. 18, 1972

[54] DIAL PULSE SENDING ARRANGEMENT

[72] Inventor: Thomas M. Quinn, West Chicago, Ill.

[73] Assignee: Bell Telephone Laboratories, Incorporated, Murray Hill, N.J.

[22] Filed: Apr. 3, 1969

[21] Appl. No.: 813,202

[52] U.S. Cl. ....................179/18, 179/90

[51] Int. Cl. ....................H04m 7/00

[58] Field of Search ....................179/18 EB, 18 BA

*Primary Examiner*—William C. Cooper
*Attorney*—R. J. Guenther and R. B. Ardis

[57] ABSTRACT

A dial pulse sender is described wherein a common generator supplies dial pulse timing signals to a group of dial pulse transmitters. Control apparatus connected to each transmitter gates a predetermined number of timing signals in accordance with stored calling signal information. The occurrence of gated timing pulses alters a stored calling signal code, and gating of timing pulses is inhibited after a predetermined code is obtained.

2 Claims, 13 Drawing Figures

INVENTOR
T. M. QUINN
BY
ATTORNEY

DIAL PULSE SENDING ARRANGEMENT

BACKGROUND OF THE INVENTION

My invention is related to signaling arrangements and more particularly to pulse sending arrangements in communications systems.

In communications systems such as telephone systems, signaling over trunk facilities by means of dial pulses is commonly used. Each transmitted dial pulse consists of two succeeding intervals: a make interval in which a metallic path is closed and a subsequent break interval in which a metallic path is opened. Dial pulse make and break intervals must be accurately timed to provide reliable signal detection over long transmission paths. Dial pulse signaling has usually required that an individual sender circuit and associated control apparatus be permanently assigned to each trunk. Where a large number of trunks are employed, a considerable investment is needed in senders and associated control equipment. Electronically controlled switching systems advantageously reduce the number of senders and control equipment through the use of a high speed electronic processor which is designed to supervise communications functions including dial pulse sending to a plurality of trunks.

In one type of priorly known electronically controlled switching system, a central control responds to stored dialing information derived from a subscriber station by generating an accurately timed series of pulses. These pulses, in turn, produce a dial pulse sequence which sequence controls the signaling applied to a selected trunk. Because of its higher speed capability, the central control advantageously controls dial pulse signals being applied concurrently to a plurality of trunks. The central control in such systems, however, is required to control the coupling of signals to a selected trunk at each make and break of the dial pulses. The high frequency of occurrence of individual dial pulses in a system requires the dial pulse control to occupy a relatively large portion of the central control cycle time so that the total capacity of the central control is restricted.

The processing of signaling information to and from the central control of an electronic switching system is generally accomplished by periodic scanning of the receiving equipment coupled to the subscriber stations in the system and the synchronized operation of sending equipment connected to associated trunks. Synchronization at a compatible scan rate is needed between the dialing information reception and the transmission of the accurately timed dial pulses to associated trunks for high-speed signal processing. The synchronization is done through common scanning apparatus connected to a dialing information store, the senders and the receivers. The receivers and senders advantageously operate at a common scan rate. This scan rate must be accurately related to the make and break intervals of the dial pulses to be transmitted and to the signaling arrangements between the subscriber station and the central control.

In a number of switching systems it is desirable to provide a plurality of sending rates, e.g., 10 pulses per second and 20 pulses per second. Since the scanning intervals must now be divided into at least two different make and break periods, the scan period is quite small and the scan rate must be increased beyond what is needed for receiving digits from a subscriber station. As a result of this faster scan rate, the scanning occupies increased central control processing time. This further reduces the time available for other central control functions associated with the switching system. Thus, there is a significant reduction in the capacity of the switching system.

BRIEF SUMMARY OF THE INVENTION

My invention is a signaling arrangement in which a common timing circuit synchronizes repetitive pairs of timing pulses and a common control, which common control selectively gates sequences of the timing pulse pairs whereby a plurality of signaling pulse sequences are concurrently applied to a group of selected transmission paths. The common control, synchronized to the common timing circuit, generates a first signal derived from stored dialing information, and this first signal is supplied to a selected signaling transmitter at the beginning of the signaling sequence corresponding to a particular stored code. The stored code is altered in the time interval between each pair of timing pulses applied to the transmitter. When the stored code is equal to a predetermined code, a second signal is applied to the common control to prevent further gating of the timing pulse. Since signals from the common control are, in accordance with my invention, required only at the beginning and at the end of each dial pulse sequence, a greater portion of the switching system cycle time is made available for other switching functions.

According to one aspect of my invention, a call store contains a code corresponding to subscriber dialing information and trunk addressing information. Signals derived from the stored code and trunk addressing information are transmitted to a signal distributor in the common control, which applies an enabling pulse to the signaling transmitter connected with the selectively addressed trunk. The enabling pulse permits the signaling transmitter to respond to repetitive timing pulses applied thereto so that a sequence of accurately timed signaling pulses are generated. The application of each timing pulse pair causes the stored code to be altered. When the altered stored code is equal to a preassigned value, the common control applies a disabling pulse to the signal transmitter which pulse terminates the gating of the repetitive timing pulses. In this way, the common control provides signals only at the beginning and end of each timing pulse sequence and the sequence causes signaling pulses corresponding to the subscriber dialing information to be applied to the selectively addressed trunk.

In an illustrative embodiment of this aspect of my invention, the common control comprises a processor and coder apparatus which operate to apply an enabling pulse of one polarity to an addressed trunk signaling transmitter, and to subsequently apply a disabling pulse of the opposite polarity to the transmitter. The enabling pulse alters the state of a bistable circuit in the signaling transmitter so that repetitive timing pulse pairs are permitted to alternately open and close the trunk path. The disabling pulse reverses the state of the bistable circuit to inhibit the application of the timing pulses. A common clock and a timing circuit synchronize the timing pulses and the enabling and disabling pulses so that the timing pulse sequence may be controlled by the common control without disrupting the accuracy of the resulting signal pulses.

According to another aspect of my invention, the associated store contains a plurality of signaling and addressing codes. These codes are sequentially applied to the common control so that a plurality of trunk signaling transmitters may be concurrently enabled to generate independent sequences of signaling pulses. The signaling pulses are thereby synchronized to a clock source that controls the timing pulses and the common control output pulses. In this way, the common control operates in synchronism to provide independent but accurately timed signaling information to each of a plurality of trunks.

DESCRIPTION OF THE DRAWINGS

FIG. 7B shows the arrangement of a particular originating register in call store 116;

DETAILED DESCRIPTION

Figures 1, 3:
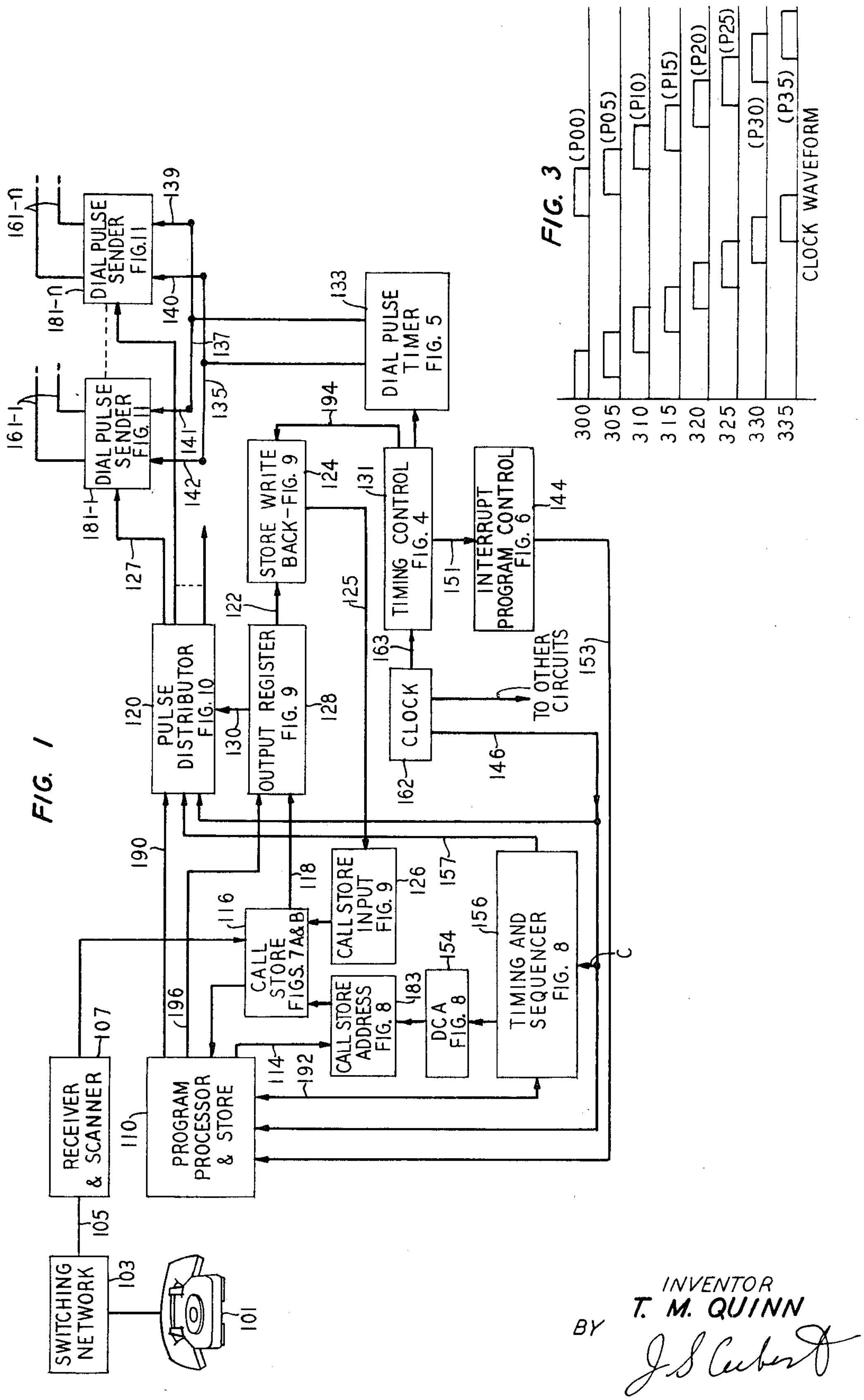
FIG. 1 depicts a block diagram of an illustrative embodiment of my invention.
FIG. 3 shows clock waveforms used in the block diagram of FIG. 1.

FIG. 1 is a block diagram which illustrates the dial pulse sending arrangements in accordance with one illustrative embodiment of my invention. My arrangement may be employed in many different types of switching systems, but particularly it is applicable to stored program controlled switching systems, such as that known as the No. 1 ESS described, inter alia, in the Sept. 1964 issue of the Bell System Technical Journal and in A. H. Doblmaier et al. application Ser. No. 334,875, filed Dec. 31, 1963. Various of the circuit elements employed in my arrangement and not described in detail herein, such as the program processor and store 110, may be of the type employed in the No. 1 ESS. To facilitate an understanding of my invention I have only indicated herein the modifications or additions to the prior circuits to enable them to function in accordance with my invention. Accordingly, reference may be made to the above-noted and other prior descriptions for a further recitation of all the details of some of the circuits referred to herein, such as the call store 116 and pulse distributor 120.

Turning now to FIG. 1, there is depicted a call store 116 which, among other functions as known in the art, stores dialing information received from a subscriber station such as station 101 via switching network 103 and receiver and scanner logic 107. The receiving process is controlled by a common control including program processor 110, and codes corresponding to the received dialing information are stored in a particular sequence of words in call store 116. The processor also derives and stores information in store 116 which is thereafter used to select a sender and the method of signaling. After the dialing information is stored in store 116, the codes corresponding thereto may be used to control the signaling of trunks 161–1 through 161–*n*. This is done by sequentially reading out all codes related to dialing information and sender addressing information from call store 116 and sending the appropriate codes to pulse distributor 120. Pulse distributor 120 of the common control in turn applies a first narrow pulse to a selected one of dial pulse senders 181–1 through 181–*n* to start a dial pulse sequence and a second narrow pulse to the same sender to terminate a dial pulse sequence.

The timing of the narrow pulses are controlled by timing control 131. Timing control 131 also sends timing information to dial pulse timer 133 which in turn applies accurately timed seize pulses to cable 137 and accurately timed release pulses to cable 135. These accurately timed pulses are further transmitted repetitively to each of senders 181–1 through 181–*n*. The enable and disable pulses from distributor 120 are derived from the same clock source and timing control as the timed seize and release pulses so that the sender is fully synchronized to the operation of the call store 116, program processor 110, and associated logic. These enable and disable pulses are used in the selected sender, e.g., 181–1, to gate the sequence of seize and release pulses from leads 141 and 142 to a device in the sender that controls the making and the breaking of the path of trunk 161–1. The seize and release pulses are applied to sender 181–*n* via leads 139 and 140.

Figure 2A:
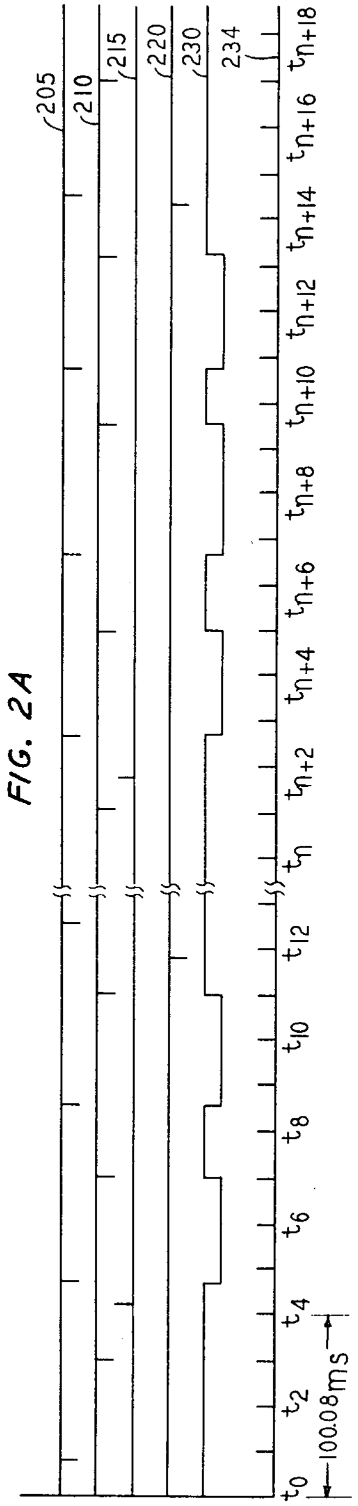
FIGS. 2A and 2B show waveforms useful in describing the 10 pulse per second and 20 pulse per second dial pulse sending operations of the block diagram depicted in FIG. 1.

FIG. 2A shows some waveforms useful in describing the 10 pulse per second dial pulse sending operation of the system of FIG. 1. The 10 pulse per second seize pulses applied to lead 141 are shown in waveform 210 and the 10 pulse per second release pulses applied to lead 142 are shown on waveform 205. The distributor output enabling pulses which start the sequence of dial pulses on trunk 161–1 are shown just before $t_4$ and just before $t_{n+2}$ on waveform 215. These sender-enabling pulses control a storage device in sender 181–1 which, when set, allows the seize and release pulses to activate the sender output. The timing of the pulse shown on waveform 215 is synchronous to the seize and release pulses applied to the sender because the timing for both is derived from the common timing control 131. Thus, the application of a sender-enabling pulse to sender 181–1 does not in any way interfere with the timing of the dial pulses which are applied to trunk 161–1. These dial pulses are shown on waveform 230.

During each make interval, identified by a relatively high level signal on waveform 230, a code is sent via cable 118, register 128, and cable 122 to logic circuit 124. At the beginning of the sending sequence this code represents the digit to be applied in dial pulse form to trunk 161–1. During each cycle of timing control 131, logic circuit 124 is operative to decrement the code applied via cable 122 by "one" and return to call store 116 the modified code from logic 124 via cable 135 and input register 126. When the code applied to cable 122 achieves a predetermined value, the dial pulse sequence corresponding to the digit being sent is complete, processor 110 is signaled to end the pulse sequence and, as a result of the operation of processor 110, a second disabling pulse is sent from distributor 120 via lead 127 to sender 181–1 to reset the sender storage device so that no further dial pulses are generated. This disabling pulse is shown on waveform 220. As in the case of the pulse starting the dial pulse sequence, the pulse terminating the dial pulse sequence is synchronous with the seize and release pulses applied to sender 181–1. This disable pulse also occurs during a subsequent make period.

Figure 2B:
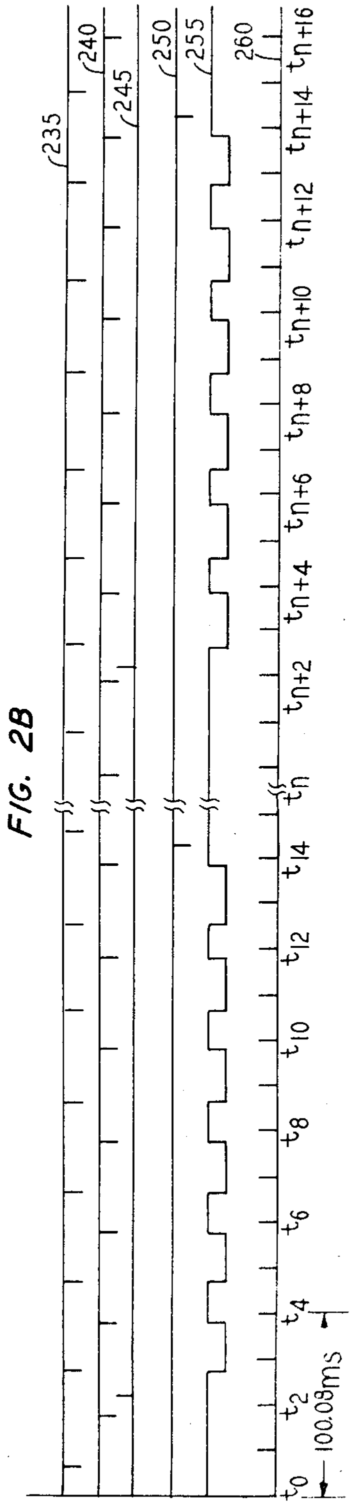

Prior to the sending of a new digit, a timed make interval (e.g., between $t_{11}$ and $t_{n+3}$ in FIG. 2A) is provided which distinguishes between successive digits. This interdigital interval is timed by inserting a predetermined code into the portion of call store allotted to the sending of the digit, which code is successively counted down. During the interdigital interval no enabling pulse from distributor 120 is applied to sender 181–1. Therefore, no seize or release pulses are gated through the sender. When the interdigital interval code has counted down to a predetermined value, an enabling pulse from the distributor may start a new sequence of dial pulses corresponding to a second digit previously received by call store 116. Waveforms 235 and 240 of FIG. 2B show the seize and release pulses for 20 pulse per second sending. Waveforms 245 and 250 show the enable and disable pulses related thereto which result in the dial pulses on waveform 255.

Timing

Both the seize and release pulses and the enabling and terminating pulses shown on FIGS. 2A and 2B are derived from and are synchronized by clock 162. The output waveforms of clock 162 are shown on FIG. 3. These pulses form an overlapping sequence of timed pulses which are used to control the timing of operations of program processor 110, call store 116, distributor 120, and timing control 131. In this illustrative embodiment the clock pulses are repetitive over a 3-microsecond period. Each pulse is 0.75 microseconds wide and overlaps the preceding and succeeding pulse by 0.375 microseconds. The clock pulses may be generated by a cascaded array of binary counter stages under control of an accurately timed oscillator or in other ways well known in the art. The pulses on waveform 300 hereinafter designated as pulse POO are the first pulses in the sequence and the pulses on waveform 335 hereinafter designated as P35 are the eighth pulses in the sequence. The intermediate pulses on waveforms 305 to 330 are designated as shown on FIG. 3. Negative going clock pulses are also provided. These are designated as POON, PO5N, etc.

Figures 4, 5, 6, 7:
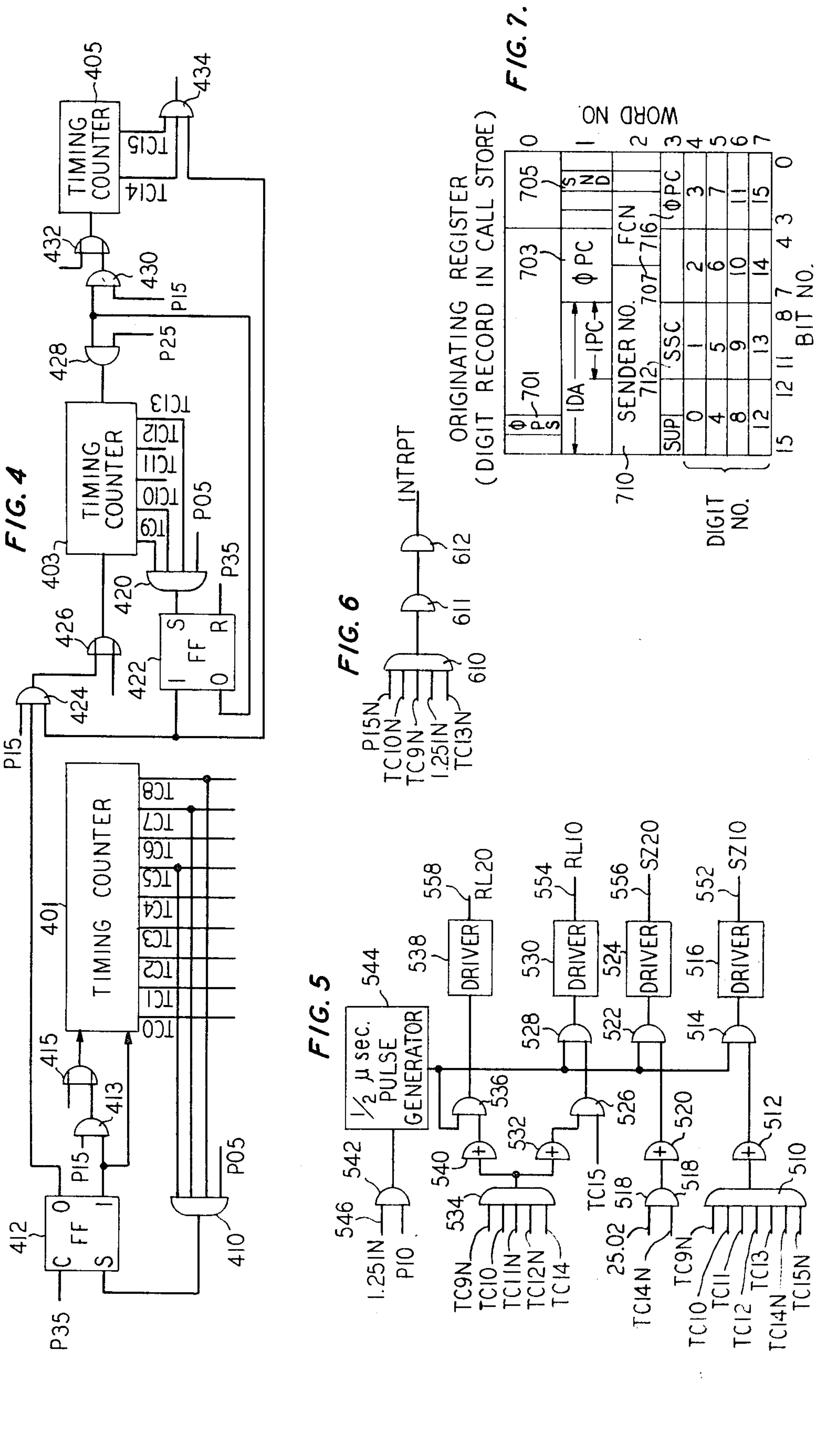
FIG. 4 shows timing counter 131 of FIG. 1 in greater detail.
FIG. 5 shows dial pulse timer 133 of FIG. 1 in greater detail.
FIG. 6 shows interrupt program control 144 of FIG. 1 in greater detail.

Timing control 131 is shown in more detail in FIG. 4 and comprises timing counter 401, timing counter 403, and timing counter 405. Timing counter 401, in this embodiment, is a series parallel counter having 9 outputs, TCO through TC8. P15 clock pulses from clock 162, spaced 3 microseconds apart, are applied to counter 401 through input gate 413. Flip-flop 412 has been previously reset at the start of the timing counter cycle so that the one output therefrom provides a ground or an enabling signal to gate 413. The P15 pulses pass through AND-gate 413 and OR-gate 415 to change the state of timing counter 401. Counter 401 counts 417 input pulses in binary fashion. This defines a 1.251-millisecond interval which is related to the memory cycle of store 116 to be hereinafter described. At count 416, outputs TC5, TC7, and TC8 are low or at ground potential so that gate 410 is opened at the next PO5 clock pulse. The high output of gate 410 during this PO5 pulse sets flip-flop 412, which flip-flop remains set until the next P35 clock pulse. The one output of flip-flop 412 inhibits gate 413 and the zero output therefrom enables gate 424 connected through OR-gate 426 to timing counter 403. As a result of the operation of flip-flop 412, the next P15 clock pulse is applied to the input of timing counter 403 rather than the input of timing counter 401. The one output of set flip-flop 412 is also applied to clear timing counter 401 to zero so that it repetitively counts 417 P15 clock pulses. After flip-flop 412 is reset, timing counter 401 repeats its operation.

Timing counter 403 comprises five cascaded binary counter stages and is pulsed via gate 424 at the end of each 1.251-millisecond interval determined by counter 401. After a decimal count of 20 has been reached in counter 403, outputs TC9, TC10, and TC13 are at ground potential and outputs TC11 and TC12 are high. At the next PO5 pulse, gate 420 is opened and flip-flop 422 is set. The setting of this flip-flop inhibits the next operation of gate 424, provides an enabling input to gate 430 coupled to counter 405, and also enables gate 428 which clears counter 403 at the next P25 pulse. Thus, counter 403 counts twenty 1.251-millisecond intervals so that flip-flop 422 is set at the end of each 25.02-millisecond interval. Four 25.02-millisecond intervals provide a complete timing counter cycle.

Timing counter 405 comprises two cascaded binary counter stages and counts successions of 25.05-millisecond intervals. The input pulse to counter 405 is applied via gate 430 at the P15 pulse occurring when flip-flop 422 is set. The outputs of counter 405 are applied to gate 434 which operates to provide a pulse at the end of each 100.08-millisecond interval.

Dial pulse timer 133 of FIG. 1 is shown in detail in FIG. 5. This timer is used to provide accurate pulses to pulse senders 181–1 through 181–*n* via cables 135 and 137 in accordance with the timing information received from the TC outputs of timing counters 401, 403, and 405. Since both 10 pulse per second and 20 pulse per second dial pulse sequences are contemplated in this illustrative embodiment, seize and release pulses at both these sending rates are required.

The make period of each 10 pulse per second dial pulse is initiated by the seize SZ10 timing pulse appearing one line 552, and the break period is initiated by the release RL10 pulse appearing on line 554. These pulses (shown on waveforms 205 and 210 of FIG. 2A) are spaced appropriately to provide a 40.032-millisecond make interval and a 60.048-millisecond break interval. In like manner the seize SZ20 pulse on line 556 starts the make period of the 20 pulse per second dialing pulses which is 17.514 milliseconds and the release RL20 pulse on line 558 starts the break period of the 20 pulse per second dialing pulses which is 35.526 milliseconds. The seize and release 20 pulses are shown on waveforms 235 and 240 of FIG. 2B.

The release 10 pulses are generated as follows: One-half microsecond pulses from generated 544 are applied to AND-gate 514. During the P10 clock pulse occurring when flip-flop 412 is set, the zero output of flip-flop 412, which is denoted 1.25N, occurs at the end of every 1.251-millisecond interval. This output occurs at an octal count of 640 in the timing counter cycle and is applied to lead 546 to enable gate 542 which in turn activates generator 544. The ½-microsecond pulse applied to gate 528 is transmitted to driver 530 during the timing counter interval defined by gates 534 and 526. The output of gate 526 is at ground potential only when timing counter outputs TC9, TC11 and TC12 are set, and outputs TC10, TC14, and TC15 are reset. During this time interval the ½-microsecond pulse from generator 544 is transmitted to driver 530 at an octal count of 015,640. The output of driver 530 provides a release 10 pulse which is transmitted to the senders via cable 135.

The seize 10 pulse is generated under control of the timing counter pulses applied to gate 510. Gate 510 requires that the TC9, TC14, and TC15 stages of the counter shown on FIG. 4 be set and that the TC10, TC11, TC12, and TC13 stages be reset. In this event, all inputs to gate 510 are at ground potential. The output of gate 510 is high so that the output of gate 512 is low and the ½-microsecond pulse from generator 544 is gated to driver 516 at an octal count of 141,640. The output of gate 510 is the seize 10 pulse which is transmitted via cable 137 to all the dial pulse senders.

The release 20 pulse appears on line 558 during the intervals defined by the inputs to gate 534. The output of gate 534 permits the pulse from generator 544 to be applied to driver 538 at octal counts of 015,640 and 115,640, and the release pulses therefrom are transmitted to the dial pulse senders via cable 135.

The seize 20 pulses appear on line 556 during the time intervals in which timing counter stage TC14 and flip-flop 422 are set. The zero output of the flip-flop, designated 25.02N, is applied to gate 518 together with the TC14 output of timing counter 405, and transmitted therefrom to gate 522 so that gate 522 passes the ½-microsecond pulses from generator 544 to driver 524 at octal counts of 063,640 and 163,640.

In addition to generating the seize and release pulses at predetermined times in the timing counter cycles, the timing control circuit provides signals which control the timing of other devices in FIG. 1 to synchronize the operation of processor 110, call store 116, logic 124, and distributor 120 during dial pulse sending. Interrupt program control 144 receives timing signals from timing control 131 via cable 151 and generates interrupt pulses which are applied to processor 110 via line 153. These pulses cause processor 110 to inspect the state of call store 116 to determine whether to interrupt its present program and provide signals which permit dial pulse sending.

Figure 7A:
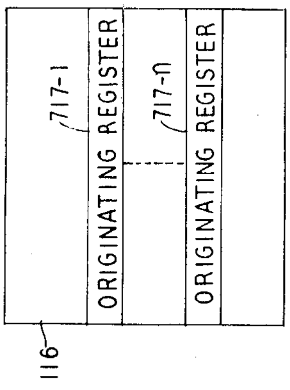
FIG. 7A shows the originating registers of call store 116 of FIG. 1.

FIG. 6 shows the logic circuitry required to generate the interrupt signal. AND-gate 610 on FIG. 6 receives signals from the TC9, TC10 and TC13 outputs of timing control 131, as well as the 1.251N output. These signals open gate 610 to pass a P15N clock signal at octal counts 23640, 63640, 123640 and 163640 in the timing counter cycle. The output signals from gate 610 occur every 25.02 milliseconds, and are inverted and amplified in gates 611 and 612 to provide the interrupt signal. The interrupt signals are shown in waveforms 234 and 260 of FIGS. 2A and 2B, Call Store The information which controls the gating of the accurately timed seize and release pulses is derived from dial pulse information contained in call store 116. FIG. 7A shows the call store and points out originating registers 717–1 through 717–*n* which provide means for storing dialing and associated control information. This storage area comprises a plurality of originating registers, each of which may be assigned to a particular call. Originating register 717–1 is shown in detail in FIG. 7B.

Referring to FIG. 7B, each originating register (OR) contains eight 16-bit words. Words 0 through 3 include stored codes for controlling dial pulse processing. Words 4 through 7 contain a storage area for 16 four-bit digit codes corresponding to call information received from subscriber stations such as station 101. Word 0 of each active OR contains codes related to the reception of dialing information from receiver 107. Bit 14 (701) of word 0 designated as the outpulse speed (OPS) bit, however, is a code set up to control the dial pulse rate. If bit 14 contains a one, the sending rate is 20 pulses per second. A zero in this bit changes the sending rate to 10 pulses per second. Bit 2 of OR word 1 (705) is a code used to flag program processor 110 when a portion of the sending program is complete so that the processor may proceed with the next portion. This bit is designated as the SND bit and is controlled by bits 4 through 7 of word one (703), which bits indicate the outgoing pulse count (OPC). OR-word 2 contains a code in bits 2 through 5 (707) that designates the type of signaling used and which portion of the sending operation is to be performed next. It also contains a code located at bits 6 through 15 (710) that designates the address of the sender to be used in a particular call. Bits 0 through 3 of OR-code 3 (716) store the location of the first digit to be sent and bits 8 through 11 (712) store the location of the last digit to be sent. These areas are designated as the outgoing digit count (ODC) and the stop sending code (SSC), respectively. Words four through seven of the OR are divided into 16 digit areas and store the digit codes to be outpulsed.

The originating registers in store 116 are located at sequential addresses to facilitate the scanning of the call processing information contained therein. Information to be read into store 116 is placed in call store input register 126 and the originating register is addressed by call store address register 183. The store may be accessed by processor 110 via cable 114 or digit address counter (DCA) 154. Any originating register may be accessed by processor 110 to initially insert information related to digit processing. The originating registers are sequentially scanned by processor 110 during repetitive 50-millisecond intervals synchronized to the seize and release timing pulses by pulses from interrupt program 144. The 50-millisecond scanning is independent of the operation of processor 110 and is controlled by logic associated with sequencer 156. During this scan, if the processor determines from a one in an SND bit of the sequentially addressed OR's that sending is required, it operates to set up the control functions necessary for dial pulse sending associated with a selected OR.

The originating registers are also scanned sequentially under control of sequencer 156 via counter 154 during autonomous and repetitive 10-millisecond intervals to update the digit processing information in all the originating registers. The read-write cycle for each word in the call store is 6 microseconds and the use of the store by processor 110 in initialization and the autonomous 50-millisecond scan is mutually exclusive to the 10-millisecond scan. The processor is generally given priority so that the 10-millisecond scan may be interrupted during its cycle. Since there are a maximum of 128 originating registers in the store in this embodiment, the interruption for a period of several microseconds does not usually interfere with the 10-millisecond scan rate. In the event that there is interference which prevents the completion of the scan within the allotted interval, the 10 -millisecond scan is given priority so that processor control is interrupted for a maximum of 204 microseconds in a 1.25-millisecond period.

After dialing information has been received from a subscriber station and assembled in a previously idle OR, the selected OR may be initialized by processor 110 if the SND bit has been set to a one and it has been determined that dial pulsing to a trunk is required. During the initialization the outpulse speed code is read into the OPS bit (701) of word 0, the sender number and function codes are stored in word 2. and the ODC and SCC codes are stored in word 3. These codes are applied via input register 126 in accordance with the address information transmitted via cable 114 to register 183. The initialization is done independently of the 50-millisecond scan and the 10-millisecond scan.

With respect to dial pulse sending, the SND bit is examined during the processor controlled 50-millisecond scan. When a one in the SND bit is detected, the 50-millisecond scan is interrupted so that the necessary sending operations associated with the then interrogated OR may be performed. After these operations have been completed the 50-millisecond scan is continued. Since only 6 microseconds are required per call store read, the time spent in examining 128 originating registers, if no receiving or sending work is required, is 768 microseconds.

Words 0 and 1 of every originating register is examined during each autonomous 10-millisecond scan. With respect to the sending operation, word 0 contains the outpulsing rate bit and one word 1 contains the outpulsing counter (OPC) and SND bits. Thus digit address counter 154 must operate in a manner that skips from the second word of the originating register being scanned to the first word of the next originating register to be scanned.

Figure 8:
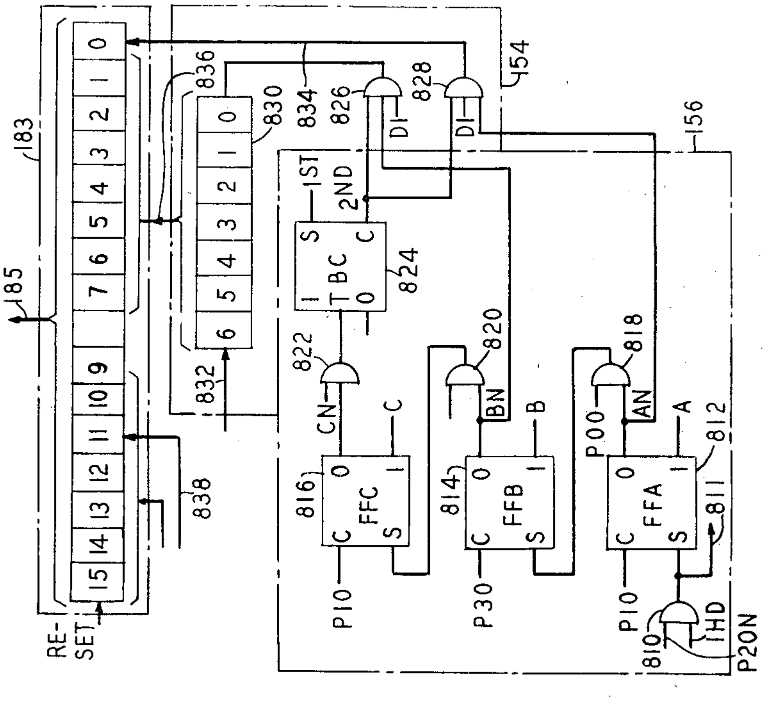
FIG. 8 shows timing and sequencer 156, digit address counter 154, and call store address register 183 in greater detail.

FIG. 8 shows sequencer 156, counter 154 and register 183 in greater detail. Sequencer 156 provides the timing signals for the read-write cycle of store 116 and the incrementing of counter 154. Under normal conditions, the count in counter 830 is returned to zero after 128 OR's have been scanned during the 10-millisecond originating register scan. If fewer than 128 OR's are used, all ones are placed in the word succeeding the last originating register. Detection of this condition inhibits the execution of all subsequent originating register functions although the remainder of the unused OR's are scanned. When the scan is complete, this inhibition is removed.

The portion of sequencer 156 shown in FIG. 8 controls the timing of the read-write cycles of the originating registers of store 116 during the 10-millisecond scan interval. Each read-write cycle is divided into three periods. This is done by sequentially operating flip-flops 812, 814 and 816. At every P20 clock pulse, gate 810 is opened in the absence of an IHD signal which inhibits the scan during processor operations. When the P2ON clock pulse and IHD inputs to gate 810 are low (near ground potential) a positive signal from gate 810 is applied to the set input of flip-flop 812. The outputs A and AN from this flip-flop are used to time various read-write control functions including addressing store 116, clearing digit output register 128 and reading from store 116. The signal from gate 810 is also applied to lead 811, which lead is then connected to inhibit the program processor operations utilizing call store 116 or distributor 120 when a 12-microsecond read-write cycle of the 10-millisecond scan is in progress. The inhibition is removed at the end of each 12-microsecond cycle. Output AN enables gate 818 to set flip-flop 814 at the next POO clock pulse. At the succeeding P10 pulse flip-flop 812 is reset. The subsequent P20 pulse is passed through gate 820 to set flip-flop 816 when flip-flop 814 is set. The next P30 pulse resets flip-flop 814 and the next P10 pulse resets flip-flop 816. Flip-flop 816 times the clearing of call store input register 126, the insertion of information in store 116, and the modification of information to be placed in store 116.

During the 10-millisecond scan both the first and second words of each OR are interrogated. Binary counter 824 is used to alternately select the first and second word of each originating register. Counter 824 is initially placed in the reset state so that the 1st signal output therefrom is active. When flip-flop 816 is set, binary counter 824 is toggled to the reset state so that the 2nd output signal is low. This signal is applied to the zero or lowest order bit of address register 183, and during the appropriate digit interval, defined by signal DI, signal DI is low and output AN is also low. At this time a positive signal is supplied via gate 828 to bit zero of register 183 so that it is put into the one state. When output BN is low, gate 826 is opened and an incrementing pulse is applied to counter 830 in digit address counter 154. After the first cycle of flip-flops 812, 814 and 816, during which the first word of an address originating register is interrogated, the next pulse from gate 810 initiates the interrogation of the second word.

At the start of the 10-millisecond scan, counter 830 is set to all zeros. Bit 0 of register 183 is jammed to zero. A gating signal is applied to lead 832 to transfer the zero signals from counter 830 to stages 1 through 7 of register 183 via cable 836. A signal is applied to lead 838 to jam bit 10 of register 183 to the one state. Bits 9 and 11 through 14 are normally reset to zero. Under these conditions the address stored in register 183 is 2000 (octal). In this embodiment, the first word of the first originating register 717-1 in call store 116 is located at octal address 2000. After the first word is interrogated, during one 6-microsecond read-write cycle, bit zero of register 183 is changed to a one through the action of binary counter 824 and gate 828 so that the next 6-microsecond read-write cycle interrogates the second word of the originating register 717–1. Counter 830 is incremented prior to the next read-write cycle. After the output of incremented counter 830 is transferred to register 183 and bit zero of register 183 is changed to zero, the first word of the originating register 717–2 is addressed. This is so because bit 1 has been changed to a one and bit 0 has been changed to a zero. The octal address at this time is 2010. The changing of bit 0 of register 183 during the second read-write cycle associated with originating register 717–2 permits the interrogation of its second word. In like manner, the first two words of each originating register are interrogated sequentially under control of sequencer 156. If, during the 10-millisecond scan interval, an operation of processor 110 involving call store 116 or distributor 120 is required, a high IHD signal is applied to gate 810 prior to the start of a P20 pulse to interrupt the originating register scan.

Digit Output Register and Store-Write-Back Logic

As aforementioned, each word read out of store 116 during the 10-millisecond scan is placed in digit output register 128 via cable 118. This transfer takes place during the POO clock pulse when flip-flop 812 of FIG. 8 is set. Just prior to the transfer, register 128 (shown on FIG. 9) is reset by the signal sent from processor 110 via lead 196. This signal is initiated in sequencer 156 by the presence of an A signal from flip-flop 812 and the absence of an inhibit from processor 110. The concurrent application of the A signal and the INH signal to gate 910 of FIG. 9 provides a high level signal to gate 912 which in turn allows gate 914 to open during the next P35 clock pulse so that register 128 is reset just before the POO read time of store 116.

With respect to the first word read related to a sending operation, only bit 14 of the first OR word in digit output register 128 is of importance This bit is applied to gate 945. The output of gate 946 is high when the CN signal from flip-flop 816 is low. Signal DI on gate 946 is low when digit operations are allowed and signal 1ST is low during the read-write cycle concerned with the read of the first originating register word. The output of gate 946 is transmitted to gate 945 via OR-gate 947 so that the OPS bit is passed to flip-flop 950 during each 10-millisecond scan first word read. Flip-flop 950 is previously reset during this cycle by gate 948 when flip-flop 812 is set. Flip-flop 950 is sent only if the OPS bit is a one. This indicates the sending rate is 20 pulses per second. Otherwise, the sending rate is 10 pulses per second. Flip-flop 950 remains in the state determined by word 0 bit 14 during the read-write cycle associated with the second originating register word.

When the second originating register word is inserted in register 128, the outputs of bits 4 through 7 are applied to write-back logic 124. If bits DO5, 6 and 7 are zero and bit DO4 is a one, the SND bit in store 116 is changed to a one which later signals processor 110 of the beginning of a new portion of the sending operation defined by the FCN code (707).

Figure 9:
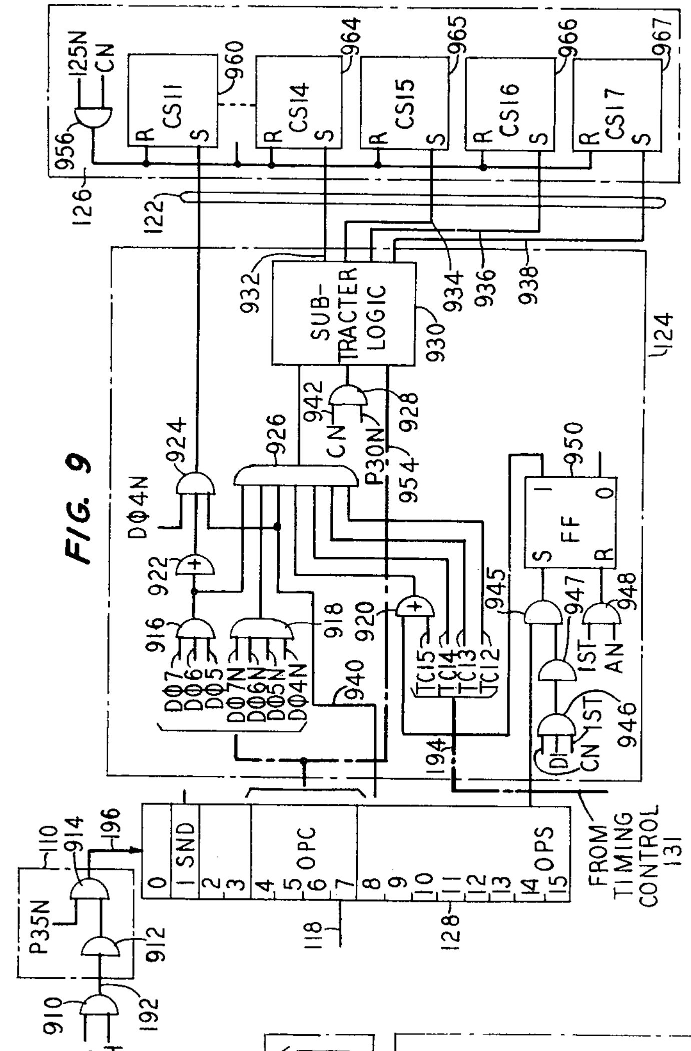
FIG. 9 shows portions of output register 128, store-write-back logic 124 and portions of call store input register 126 in greater detail.

Referring to FIG. 9, the D05, D06, and DO7 signals are applied to gate 916 from register 128. If all the inputs of gate 916 are low, the output is high so that the input to gate 924 from gate 922 is low. The presence of a DO4 one bit makes the DO4N input to gate 914 low. During the interval from P20 to POO, when flip-flop 816 is set in the second word read, a signal from lead 940 forces the output of gate 924 high and an enabling input is applied to flip-flop 960 of register 126. This flip-flop provides a one input to the SND bit of the second word of the originating register being processed so that the SND bit is set when the OPC code (703) read out of the originating register is 0001.

Decrementing of the OPC bits is accomplished as follows. During the first and fifth 10-millisecond periods of each timing counter cycle, the TC12 through TC14 outputs from timing control 131 are all zero. These outputs together with the TC15 output are coupled to write-back logic 124 via cable 194. TC12, 13 and 14 are low during these 10-millisecond intervals. If the sending rate is 20 pulses per second, flip-flop 950 which stores the OPS bit of this originating register provides a high input to gate 920 so that the output of gate 920 is low. This provides the timing information for gate 926 so that it can enable subtractor logic 930 during the first and fifth 10-millisecond periods of the timing counter cycle. If, however, flip-flop 950 was reset indicating a 10 pulse per second sending rate, gate 926 can be enabled only during the fifth 10-millisecond period of the timing counter cycle because the TC15 output then activates gate 920 to enable gate 926. This arrangement allows the decrementing of the OPC bits every 50.04 milliseconds for the 20 pulse per second rate and every 100.08 milliseconds for the 10 pulse per second rate.

The output of gate 916 is also applied to gate 926. In the event that bits DO5 through DO7 are all zeros, gate 916 inhibits the operation of gate 926. This is so because the then present OPC code indicates the completion of a portion of the sending operation. Gate 918 inhibits the operation of gate 026 in the event that bits DO4 through DO7 are all ones. This code represents a decimal 15 and is not permitted to result in dial pulse sending.

The signal on lead 940 provides timing information which allows gate 926 to be enabled during the second word read of each originating register. Gate 928 enables subtractor logic 930 during the P30 pulse when signal LN from set flip-flop 816 is low. Register 126 has been previously reset via gate 956 during the preceding P25 clock pulse. Under these conditions, the OPC bits are applied to subtractor logic 930 via cable 954; and, the output of logic 930, the input OPC code decremented by one, is applied to flip-flops 964, 965, 966 and 967 in register 126 via leads 932, 934, 936 and 938. This insures that the OPC code inserted into the second word of the originating register being processed is the decremented value.

The decrementing of the OPC code via write-back logic 124 occurs at the beginning of each alternate 25-millisecond interrupt cycle when the OPS bit is one, indicating a 20 pulse per second sending rate, e.g., $t_0$ and $t_2$ on FIGS. 2A and 2B, and at 25-millisecond interrupt cycle occurring 50 milliseconds into the timing counter cycle when the sending rate is 10 pulses per second, e.g., $t_2$ on FIGS. 2A and 2B. At the beginning of these 25.02-millisecond interrupt intervals, the signals shown on the waveforms 234 and 260 are sent to processor 110 from interrupt program control 144 via lead 153 so that the processor may generate the needed control signals for dial pulse sending.

Pulse Distributor

Figures 10, 11:
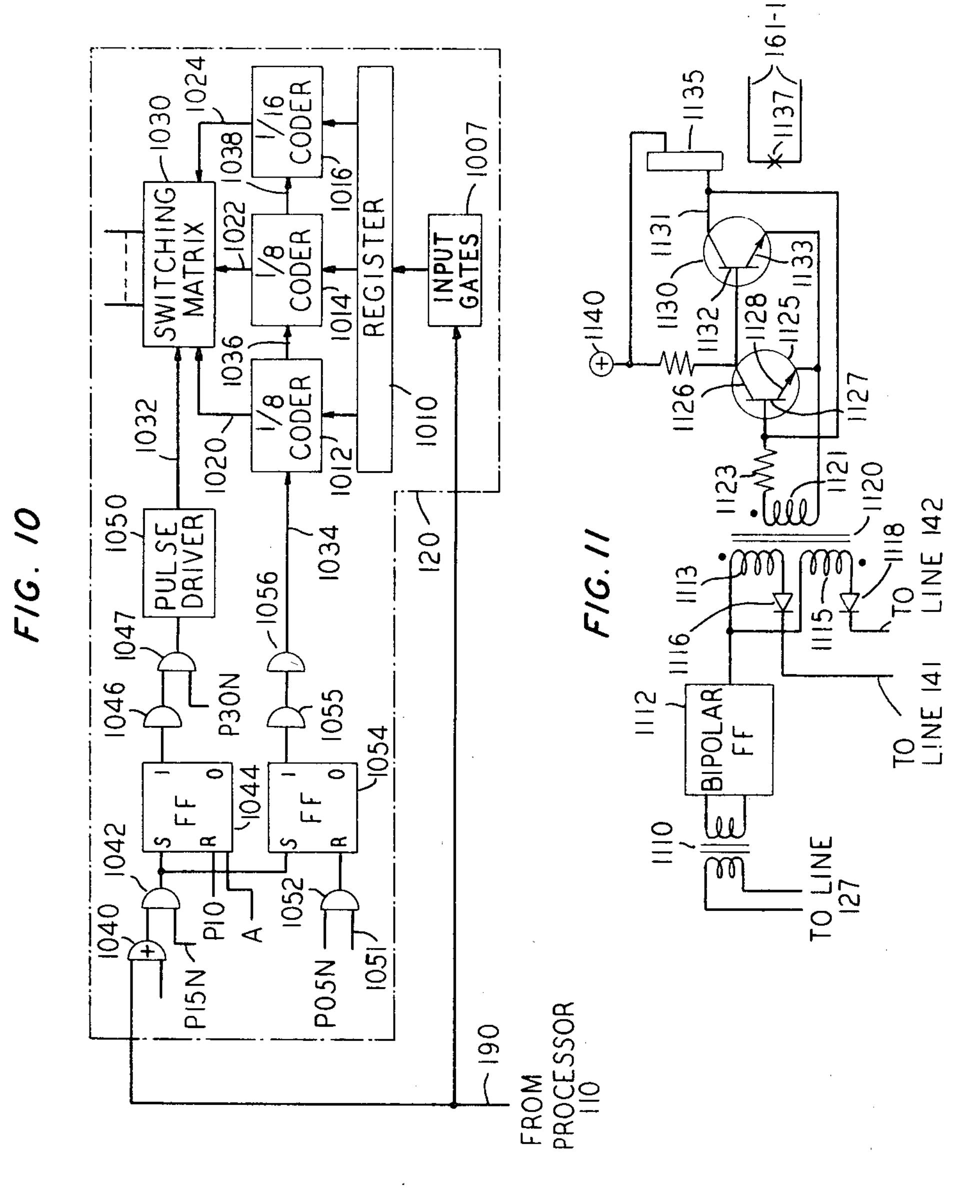
FIG. 10 shows pulse distributor 120 of FIG. 1 in greater detail.
FIG. 11 shows a dial pulse sender of FIG. 1 in greater detail.

Pulse distributor 120, shown in greater detail in FIG. 10, receives address information from processor 110 and selectively transmits output pulses to one or more of various utilization devices such as dial pulse senders 181–1 to 181–N in accordance with the received address information. In the case of dial pulse sending, sender address codes (710) from word 3 of a sending originating register are transmitted to processor 110 where the codes are translated. The translated codes are sent therefrom via cable 190 to input gate arrangement 1007 of distributor 120. The code is stored in register 1010 and is decoded in one out of eight coder 1012, one out of eight coder 1014, and one out of 16 coder 1016. The outputs of these coders are applied to switching matrix 1030 so that one line out of 512 output lines is selected. In dial pulse sending, the selected line is connected to one of dial pulse senders 181–1 through 181–N.

A control signal from processor 110 synchronized to the operation of timing control 131 is applied via cable 190 to OR-gate 1040 to initiate the enabling of a dial pulse sender. This signal generates a pulse that permits the outputs of coders 1012, 1014 and 1016 to be applied to matrix 1030 and also provides an enabling pulse that will pass through matrix 1030 to the selected output line and therefrom to the selected dial pulse sender. The output of gate 1040 in response to the control signal is a low signal that is applied to enable AND-gate 1042. At the next P15 clock pulse, gate 1042 opens and a high signal is applied to both flip-flops 1044 and 1054. Flip-flop 1054 was previously reset by the preceding PO5 clock pulse applied via gate 1052 during the first 3 microseconds of the present 12-microsecond read-write cycle. This is controlled by the signal applied to lead 1051. The one output of flip-flop 1054 is transmitted through gates 1055 and 1056 to line 1034 from which it is successively applied to coders 912, 914 and 916 via leads 1036 and 1038. This signal selects a particular path in matrix 1030 via cables 1020, 1022 and 1024 so that only one output line is selected in accordance with the translated sender address stored in register 1010.

The one output of flip-flop 1044 is applied to gate 1047 via gate 1046. Gate 1047 is opened at the next P30 clock pulse to provide an enabling signal to pulse driver 1050. At this time register 1010 contains the proper address code and driver 1050 applies an enabling pulse to the selected path in matrix 1030 via line 1032. Matrix 1030 in turn applies the enabling pulse to the selected dial pulse sender. In this way, a particular sender is selectively connected to the common control including processor 110 and distributor 120. Upon completion of the dial pulse sequence of the digit being sent, the sender code (710) is again transmitted to register 1010 and a second set of pulses are applied to lines 1032 and 1034 which cause a disabling pulse to be applied to the selected dial pulse sender. The sender code must be retransmitted because the pulse distributor must be available in the interval between the enable and disable pulses to control all the dial pulse senders since they may operate concurrently.

Only one line is connected from distributor 120 to each dial pulse sender. Matrix 1030 is arranged to provide a positive pulse to start a dial pulse sending sequence and a negative pulse to terminate a dial pulse sending sequence. The polarity of these pulses is determined by the address in register 1010 and the matrix arrangement. In accordance with this embodiment, the switching matrix comprises a plurality of transformers connected to its output lines. These transformers are arranged in a manner well known in the art to selectively provide positive enable and negative disable pulses on the basis of the addresses from register 1010.

Dial Pulse Sender

FIG. 11 shows a dial pulse sender such as 181–1 in detail. In FIG. 11, bipolar flip-flop 1112 receives enabling and disabling pulses from distributor 120 via transformer 1110. The enabling pulse sets flip-flop 1112 and a positive potential is placed on the anode of diodes 1116 and 1118 so that dial pulse timing signals from timer 133 may be applied to transformer windings 1113 and 1115. Transformer windings 1113 and 1115 together with diodes 1116 and 1118 form a gating arrangement for controlling the application of timing pulse pairs to the circuit connected to winding 1121. When flip-flop 1112 is set, the next seize pulse applied to the cathode of diode 1116 causes a negative pulse to be applied to base 1127 of transistor 1125 which turns off transistor 1125. Current from positive voltage source 1140 now flows through the base-emitter circuit of transistor 1133 so that transistor 1133 conducts, relay 1135 operates, and relay contacts 1137 close. In this way the path through trunk 161 via contacts 1137 is completed and a make period is initiated. Flip-flop 1112 operates to select the gating arrangement of a particular sender in response to enable signals from the control including distributor 120.

The succeeding release pulse is applied to diode 1118 which causes a positive signal to appear at base 1127. Transistor 1125 then conducts and transistor 1133 is cut off. At this time contacts 1137 open and a break period on trunk 161–1 is initiated. Successive make and break intervals are generated until a disabling pulse is applied to bipolar flip-flop 1112 from distributor 120. The disabling pulse resets flip-flop 1112 and a relatively low voltage is placed on the anodes of diodes 1116 and 1118 so that these diodes are rendered nonconductive. The seize and release pulses can no longer be coupled to transistor 1125.

Dial Pulse Sending Operation

After dial pulse information has been received from a station, codes corresponding to the received information have been stored in words 4 through 7 of a selected originating register, and it has been determined by program processor 110 that the call is to an outside central office, dial pulse sending may be set up. Program processor 110 is arranged to periodically determine the states of all originating registers. The completion of dial pulse receiving signals program processor 110 to set up the selected originating register for dial pulse sending. The selected originating register is addressed by program processor 110 so that the register may be conditioned to control dial pulse sending. This requires that an OPS bit be placed in OR-word 0 to control the sending rate; that the OPC code (703) in OR-word 1 be replaced by a binary 2 code; that the corresponding sender number (710) and the appropriate sending function (707) code be placed in OR-word 2; and that the ODC and SCC codes be set up in OR-word 3. The ODC code (716) indexes which stored dial pulse code in words 4–7 is to be sent next and the SSC code (712) determines when dial pulse sending is to stop. The OR conditioning requires four successive read-write cycles. These cycles occur asynchronous to the aforementioned 10-millisecond and 50-millisecond scans.

As hereinbefore mentioned with respect to write-back logic 124, the OPC code of every originating register is decremented during the first 10-millisecond scan in selected 25-millisecond interrupt periods. The OPC code is used to control the number of sender output signals in a sequence corresponding to the digit to be sent and the timing of the interdigit and end of sending intervals. Assume for purposes of illustration that the sending rate is 10 pulses per second and that the first and second dial pulse codes to be sent are 2 and 3, respectively. In this event and after selected OR has been conditioned for dial pulse sending, the OPC is decremented from 2 to 1 during the first 10-millisecond scan of the 25-millisecond interrupt beginning at $t_2$ at FIG. 2A. It is understood that all active originating register OPC codes are sequentially decremented by one during this 10-millisecond scan so that dial pulse sending from a plurality of senders may occur concurrently.

The OPC code of the selected originating register now equals one and the SND bit OF OR-word 1 is set during the next 10-millisecond period of this interrupt. This SND bit controls the enabling and disabling of a sender through processor 110 and distributor 120. The SND bit is read by processor 110 during its normal 50-millisecond scan and a one in this SND bit signals processor 110 to transfer to the sending program stored therein. After the next seize pulse on waveform 210 has occurred just subsequent to $t_3$ in FIG. 2A, the sender number in the selected originating register is read into program processor 110 which operates to translate the number and to transmit the translated sending number to pulse distributor 120. The ODC code which indexes the digit to be sent (in this case the digit 2) is removed from the OR under control of processor 110, incremented by 1, and stored in the OPC. The OPC now contains a 3. The FCN number in OR-word 2 is changed to a code which will allow future disconnect of the sender.

Pulse distributor 120 then provides an enable pulse shown (on waveform 215) as hereinbefore described with reference to FIG. 10. This enable pulse is timed by processor 110 to occur between a seize and a release pulse. In this way, the connected sender can be turned on only during a make interval. The next release pulse, occurring after $t_4$, is applied to diode 1116 and is effective to change the state of transistor 1133 in the sender so that relay contacts 1137 are opened. At this time, the first break interval of the digit sending sequence is initiated. During the first 10-millisecond scan of the $t_6$ 25-millisecond interrupt, the OPC is decremented from 3 to 2. The SND bit remains in the zero state; the sender is still enabled; and the next seize pulse on waveform 210 is effective to close contacts 1137 to initiate a make period. The next release pulse on waveform 205 initiates a second break period and the OPC is decremented to one during the first 10-millisecond scan of the $t_{10}$ interrupt. This causes the SND bit to be set to a one in the immediately succeeding 10-millisecond scan so that a disable pulse may be transmitted from distributor 120 to the connected sender during the next possible make period.

The setting of the SND bit signals processor 110 to start the next portion of the send program in accordance with the FCN code. This send program operates to cause the ODC code to be incremented, to change the OPC code to 7 to time an interdigital interval of 600 milliseconds, and to change the FCN code so that a new dial pulse sequence may be started after the completion of the interdigital interval.

During the interdigital interval, the sender remains disable but the OPC is decremented once each timing counter cycle. At the end of six such cycles, the OPC is decremented to one and the SND bit is set again. At this time under program processor control, the ODC code is compared to the SSC code. If they are equal, the dial pulse sending has been completed and processor 110 returns to its normal functions. Otherwise, the ODC is incremented and the dial pulse sequence corresponding to the next digit, in this case a 3, is started.

Assume that at $t_n$ the interdigital interval is complete. Under control of the sending program from processor 110, the new digit to be sent as indexed by the incremented ODC is now removed from OR-word 2 is incremented by one and is stored in the OPC. The sender number is again translated by the program processor and transmitted to the pulse distributor. The FCN code is changed again to allow future disconnect of the sender. The sender is then enabled after the seize pulse occurring subsequent to $t_{n+1}$ as shown on waveform 215. This permits the next release pulse of the waveform 205 to initiate a break period. Then, during the next two make-break periods, the OPC is decremented from 4 down to 2 under control of the 10-millisecond scan arrangements. During the third break interval and just after $t_{n+12}$ in FIG. 2A, the OPC is decremented to one and the SND bit is again set. This signals the call of the send program so that program processor 110 increments the ODC, changes the FCN code to start a new digit sequence, and sets the OPC to 7 to start an interdigital interval. In this manner dial pulse sending based on the codes stored in the selected originating register is accomplished. When the ODC code is equal to the SSC code, dial pulse sending is completed and the originating register is then placed in a state which permits the receipt of dial information corresponding to another call after an appropriate end-of-sending interval.

Dial pulse sending at 20 pulses per second is substantially the same as described with respect to the 10 pulse per second arrangements except that the OPC bit (701) is initially set to be one. This, in turn, causes the 20 pulse per second seize and release pulses (waveforms 235 and 240) to be applied to the selected sender and also causes the OPC code (703) to be decremented during the first and third interrupt intervals of each timing control cycle. As a result there are two make-break periods in each 100.08 timing control cycle.

Assume for purposes of illustration that two received succeeding digits are 6 and 5 and these digits have been stored in a selected OR which has also been conditioned for sending as hereinbefore described. At the start of the first digit sending sequence($t_0$ in FIG. 2B) the OPC is set to 7. The enable pulse on waveform 245 occurs in make period during the $t_2$ 25-millisecond interrupt interval so that the first break period is initiated by the release pulse just prior to $t_3$ and the OPC is decremented to 6 during the first 10-millisecond scan of the $t_2$ interrupt interval. The OPC is then decremented in the $t_4$, $t_6$, $t_8$, $t_{10}$, and $t_{12}$ interrupt intervals. After the first 10-millisecond scan in the $t_{12}$ interrupt interval, the OPC is 1 so that the SND bit is set in the succeeding 10-millisecond scan and a disable pulse (waveform 250) is applied just after $t_{14}$ during the next make period. Between $t_2$ and $t_{14}$ six make-break periods occur which correspond to the stored digit being sent.

After $t_{14}$ a 600-millisecond interdigital interval is timed by store write-back logic 124, which interval is assumed to be complete just prior to $t_{n+2}$ on FIG. 2B. During the $t_n$ interrupt interval on FIG. 2B the OPC is decremented to one and the SND bit is set so that the second digit, a 5, causes the OPC code to change to a 6. In the $t_{n+12}$ interrupt interval on FIG. 2B, the OPC again is decremented to one; the SND bit is set; and a disable pulse is applied to the connected dial pulse sender just after $t_{n+14}$ on FIG. 2B. In this way, two succeeding dial pulse sequences are generated having 50-millisecond make-break periods.

What is claimed is:

1. In a telephone switching system having a call store, a plurality of trunks, a plurality of gating means connected to said trunks, and a source of timing pulses, a dial pulse signaling method comprising the steps of 1. generating repetitive pairs of timing pulses defining dial pulse intervals,
2. storing a signal code and a signaling control code corresponding to signals received from an associated station in a call store,
3. selecting one of a plurality of gating means in response to said signaling control code,
4. enabling said gating means in synchronism with said timing pulse pairs to pass said timing pulse pairs in response to one value of said signaling code,
5. producing a dial pulse in response to each gated pulse pair,
6. altering said signaling code upon the occurrence of each gated pulse pair, and
7. disabling said gating means in synchronism with said timing pulse pairs responsive to a second value of said signaling code.

2. The method set forth in claim 1 wherein the steps of generating the repetitive pairs of timing pulses and enabling and disabling of the gating means in synchronism comprise the steps of:

generating a plurality of recurring clock pulses defining discrete time periods, generating the repetitive pulse pairs in response to a noncoincident pair of recurring clock pulses, and enabling and disabling said gating means in response to recurring clock pulses which coincide with neither of the noncoincident pair of clock pulses employed in the generation of the repetitive pulse pairs.

* * * * *

UNITED STATES PATENT OFFICE
CERTIFICATE OF CORRECTION

Patent No. 3,636,264 Dated January 18, 1972

Inventor(s) Thomas M. Quinn

It is certified that error appears in the above-identified patent and that said Letters Patent are hereby corrected as shown below:

Column 3, line 20, after "1963" and preceding the period, insert --, now U. S. patent 3,570,008 issued March 9, 1971--. Column 5, line 37, "25.05" should read --25.02--; line 51, "one" should read --on--; line 60, "35.526" should read --32.526--; line 64, "generated" should read --generator--. Column 8, line 3, "operation" should read --operations--. Column 9, line 46, "sent" should read --set--; line 61, "914" should read --924--. Column 10, line 26, "LN" should read --CN--. Column 13, line 11, "disable" should read --disabled--; line 48, "OPC" should read --OPS--.

Signed and sealed this 28th day of November 1972.

(SEAL)
Attest:

EDWARD M.FLETCHER,JR.
Attesting Officer

ROBERT GOTTSCHALK
Commissioner of Patents